US008072494B2

(12) United States Patent
Qiu et al.

(10) Patent No.: US 8,072,494 B2
(45) Date of Patent: Dec. 6, 2011

(54) DEVICE AND METHOD FOR AUTOMATICALLY TESTING DISPLAY DEVICE

(75) Inventors: Jin-Quan Qiu, Shenzhen (CN); Xiao-Man Pu, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 492 days.

(21) Appl. No.: 12/417,610

(22) Filed: Apr. 2, 2009

(65) Prior Publication Data

US 2010/0079596 A1 Apr. 1, 2010

(30) Foreign Application Priority Data

Sep. 26, 2008 (CN) .......................... 2008 1 0304695

(51) Int. Cl.
*H04N 17/00* (2006.01)
*H04N 17/02* (2006.01)

(52) U.S. Cl. ......... 348/189; 348/179; 348/182; 348/184

(58) Field of Classification Search .......... 348/177–179, 348/180–182, 184, 189, 191
See application file for complete search history.

(56) References Cited

U.S. PATENT DOCUMENTS

| | | | | | |
|---|---|---|---|---|---|
| 5,343,251 | A | * | 8/1994 | Nafeh | 348/571 |
| 5,572,444 | A | * | 11/1996 | Lentz et al. | 702/117 |
| 5,671,011 | A | * | 9/1997 | Kim | 348/189 |
| 6,567,117 | B1 | * | 5/2003 | Nago et al. | 348/180 |
| 6,700,627 | B2 | * | 3/2004 | Yang et al. | 348/674 |
| 6,850,245 | B1 | * | 2/2005 | Murashita et al. | 345/589 |
| 6,954,216 | B1 | * | 10/2005 | Dowling et al. | 345/593 |
| 7,009,660 | B2 | * | 3/2006 | Kim | 348/558 |
| 7,199,818 | B1 | * | 4/2007 | Engholm | 348/184 |
| 7,233,324 | B2 | * | 6/2007 | Sugiyama et al. | 345/204 |
| 7,405,723 | B2 | * | 7/2008 | Kang et al. | 345/156 |
| 7,643,090 | B2 | * | 1/2010 | Ramaswamy et al. | 348/558 |
| 7,664,317 | B1 | * | 2/2010 | Sowerby | 382/162 |
| 7,667,734 | B2 | * | 2/2010 | Uehara | 348/177 |
| 7,760,231 | B2 | * | 7/2010 | Sayre | 348/189 |
| 7,916,214 | B2 | * | 3/2011 | Kimura et al. | 348/558 |
| 2005/0259153 | A1 | * | 11/2005 | Oka | 348/189 |
| 2006/0170776 | A1 | * | 8/2006 | Scott et al. | 348/192 |
| 2006/0276983 | A1 | * | 12/2006 | Okamoto et al. | 702/69 |
| 2006/0290783 | A1 | * | 12/2006 | Kubota et al. | 348/181 |
| 2008/0239082 | A1 | * | 10/2008 | Zhu et al. | 348/181 |
| 2009/0303331 | A1 | * | 12/2009 | Yoon et al. | 348/189 |
| 2011/0063455 | A1 | * | 3/2011 | Krancher et al. | 348/180 |

* cited by examiner

*Primary Examiner* — Brian Yenke
(74) *Attorney, Agent, or Firm* — Altis Law Group, Inc.

(57) ABSTRACT

A method for automatically testing display device. The method includes steps of: capturing an image; acquiring a horizontal strip of a to-be-tested image which includes at least a portion of each of the color interval column of the image; comparing a standard deviation A of RGB values of pixels in a vertical sample with a standard deviation B of RGB values of pixels an adjacent vertical sample to obtain samples of each color interval from many samples taken; taking pixels from many vertical samples of each color interval to calculate a mean value of the RGB values of each color interval respectively, determining a color corresponding to each of color intervals, and determining an interval sequence of the to-be-tested image and the code sequence of the color intervals; and determining an image format corresponding to the code sequence according to the image format table which records a plurality of image formats corresponding to the interval sequences of the color intervals of the images.

4 Claims, 6 Drawing Sheets

DEVICE AND METHOD FOR AUTOMATICALLY TESTING DISPLAY DEVICE

BACKGROUND

1. Technical Field

The present disclosure relates to a device and a method for automatically testing image format compatibility of a display device.

2. Description of Related Art

In general, manufacturers will enable display devices to display images of different formats. Accordingly, a corresponding test method to check if the display device is able to display image files of all the formats as it is supposed to.

Typically, image format testing of a display device requires loading image files of each format the display device is designed to be compatible with, then an operator must open each file one at a time and view it, which consumes a lot of time and manpower.

DETAILED DESCRIPTION OF THE EMBODIMENTS

Figure 1:
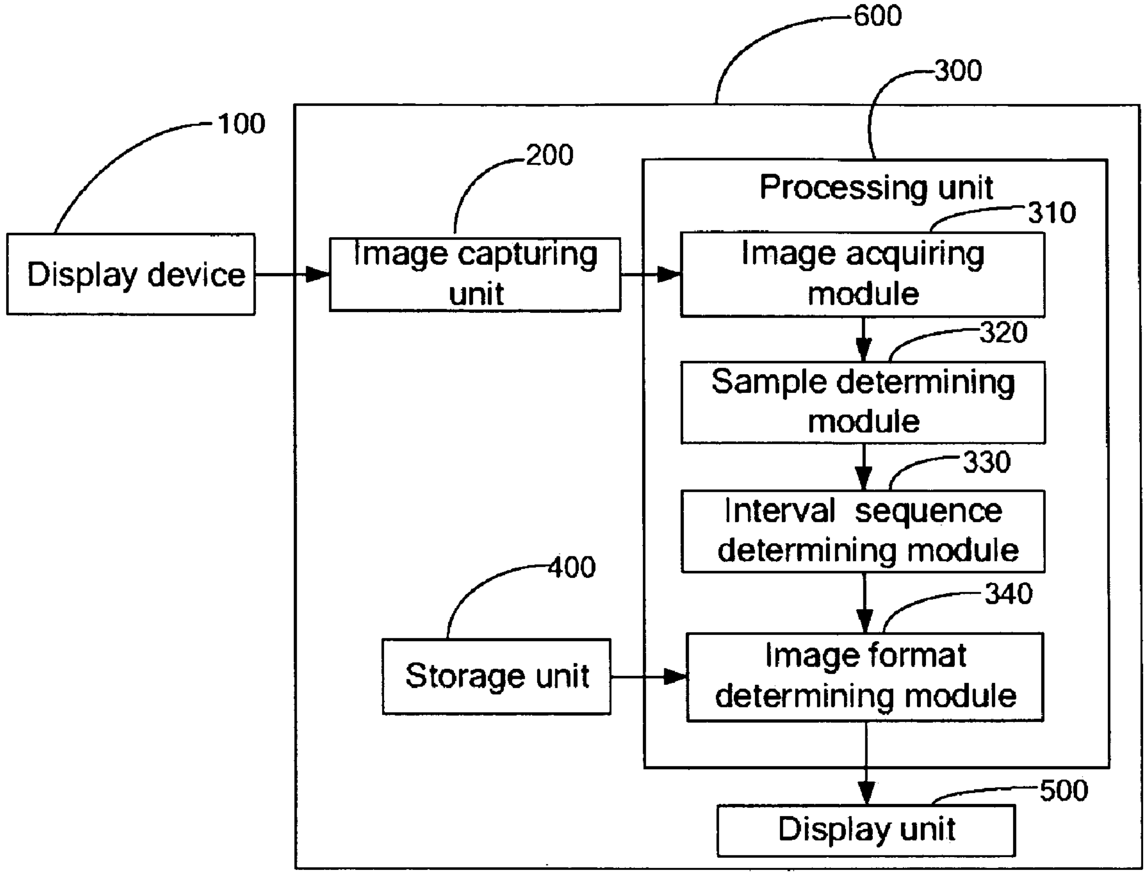
FIG. 1 is a block diagram of a hardware infrastructure of a system for automatically testing display device in accordance with an exemplary embodiment.

FIG. 1 is a block diagram of a hardware infrastructure of a system for automatically testing display device in accordance with an exemplary embodiment. The system includes a display device 100 to be tested, and a test device 600. The display device 100 can be an electronic apparatus for example, but not limited to, a digital photo frame (DPF), a MP4, and so on. The display device 100 includes a storage unit (not shown), a decoding unit (not shown), and a display unit (not shown). The storage unit is configured to store a plurality of testing images in different image formats. The decoding unit is configured to decode the stored testing images in different image formats. The display unit is configured to selectively display each decoded image in turn to test display properties of the display device for each format. If any one or more of the images is not properly displayed then the display device can be adjusted accordingly. Wherein the adjustments may be made in regard of resolution, lightness, contrast ratio, and so on, for the corresponding format of the failed image. The test device 600 is configured to determine which image formats of images are successfully displayed by the display device 100.

Figure 2A:
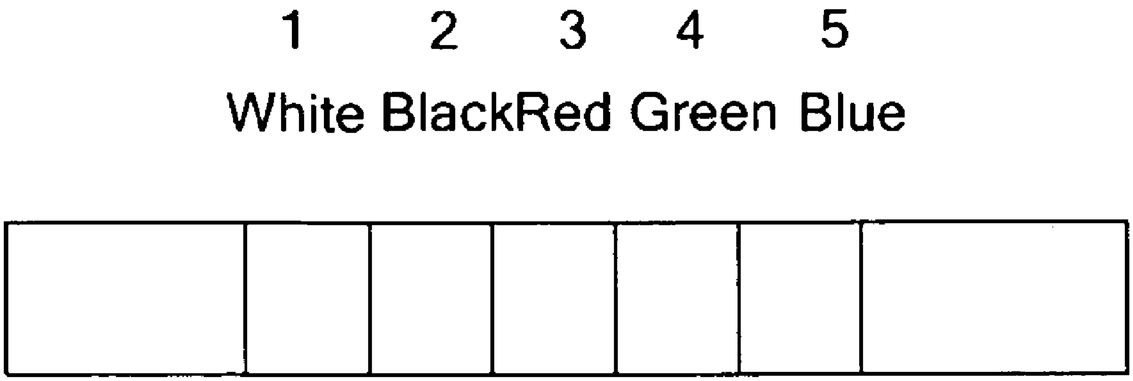
FIGS. 2A-2D are schematic diagrams showing a process of a display device testing by the test device of FIG. 1 in accordance with an exemplary embodiment.

Each of the stored testing images in the storage unit of the display device 100 is composed of at least two color intervals in columns of equal size and typically not the same color as the color interval. The color intervals include, but are not limited to, white, black, red, green, and blue intervals. Each of the color intervals is assigned an identification code. For example, the white interval is coded as "1", the black interval "2", the red interval "3", the green interval "4", and the blue interval "5". For each image format to be tested of an image containing a specific sequence of the color intervals will be used. For example, in the exemplary embodiment as shown in FIG. 2A, the sequence of color intervals "12345" could be used in a GIF image. Thus, the test device 600 can recognize any image with that sequence of color intervals as being a GIF image, and another sequence as being a JPEG image and so on.

The test device 600 includes an image capturing unit 200, a processing unit 300, a storage unit 400, and a display unit 500. The image capturing unit 200 is configured to capture images of the testing images displayed by the display device 100. In the exemplary embodiment, the image capturing unit 200 can be a built-in camera. In another exemplary embodiment, the image capturing unit 200 can be an external device which is connected to the processing unit 300 via an interface, for example: a camera, a mobile telephone, and so on.

The storage unit 400 is configured to store the captured images and an image format table. The image format table records a plurality of image formats of the images, namely the interval sequences of the images. For example, in the exemplary embodiment as shown below in TABLE. 1, the image format table shows three interval sequences respectively associated with three image formats. That is, the interval sequence "12345" is associated with the GIF format; the interval sequence "21345" is associated with the JPG format; and the interval sequence "23145" is associated with the BMP format.

TABLE 1

| Interval sequences | Image formats |
|---|---|
| 1 2 3 4 5 | GIF |
| 2 1 3 4 5 | JPG |
| 2 3 1 4 5 | BMP |
| . | . |
| . | . |
| . | . |

The processing unit 300 includes an image acquiring module 310, a sample determining module 320, an interval sequence determining module 330, and an image format determining module 340.

Figure 2B:
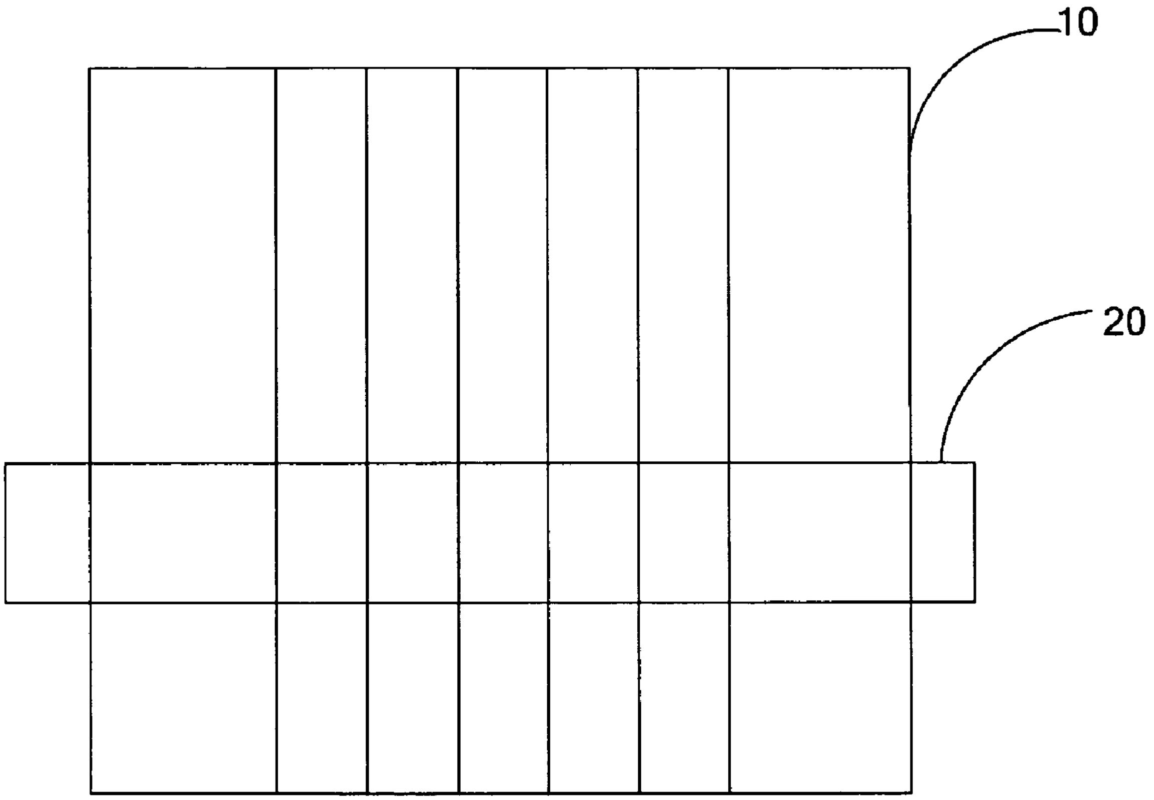

The image acquiring module 310 is configured to acquire a horizontal strip of a to-be-tested image which includes at least a portion of each of the color interval columns of the image, as shown in FIG. 2B.

Figure 2C:
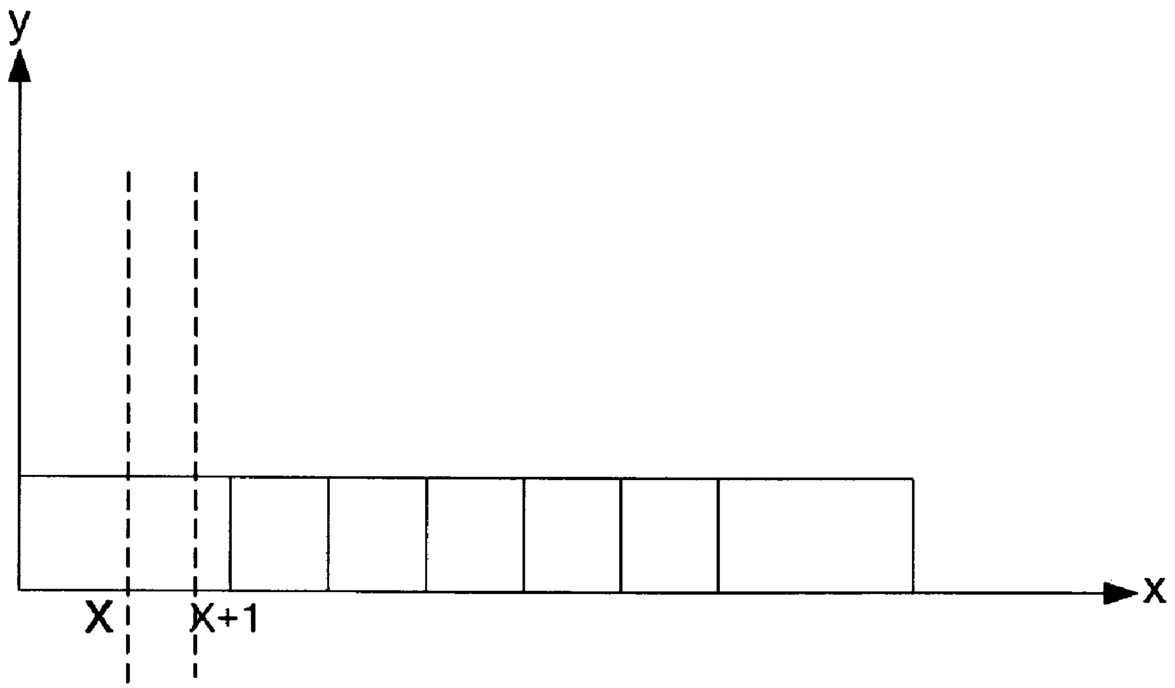

The sample determining module 320 is configured to compare a standard deviation A of RGB values of pixels in a narrow vertical sample of the horizontal strip with a standard deviation B of RGB values of pixels of an adjacent vertical sample to obtain samples of each color interval from many samples taken. In the exemplary embodiment, the sample determining module 320 determines which of the many vertical samples obtained can be used to represent each of the color intervals according to the following. Initially, the sample determining module 320 defines a coordinate system for the acquired to-be-tested image, as shown in FIG. 2C, and defines the leftmost point of the acquired to-be-tested image as an origin of the coordinate system. In the coordinate system, narrow vertical strips of pixels are sampled and examined at regular intervals, and then the standard deviation of RGB value of pixels of one vertical strip are compared to the standard deviation of RGB value of pixels in an adjacent vertical strip to determine if the two vertical samples are from the same color interval or different color intervals. Pixel locations are represented as P (x, y). The standard deviation of each vertical sample is represented as R (x). Mean value of the pixels of the same vertical sample is represented as P ($x_0$ $y_0$). Thereafter, the sample determining module 320 executes the following steps. First the sample determining module 320 calculates a P ($x_0$ $y_0$) of pixels of the same vertical sample; second, calculates a difference of each pixel of the same vertical sample from the P ($x_0$ $y_0$); third, squares each difference; fourth, averages all squared differences to generate a mean value; fifth takes a square root of the generated mean value to generate a standard deviation R (x). Then, the sample determining module 320 calculates another standard deviation R (x+1) of adjacent vertical strip according to the above steps. Finally, the sample determining module 320 calculates an absolute value D(x) of a difference between R(x+1) and R(x), and compares the absolute value D(x) with a predetermined value. The sample determining module 320 defines that the two vertical samples are from the same color interval if the absolute value D(x) is less than the predetermined value and discards one and obtains another one for comparison with the kept vertical sample. Otherwise, the two vertical samples are from the different color intervals if the absolute value D(x) is greater than the predetermined value and the vertical sample of the two vertical samples obtained to the right of the other in the image is stored, and the remaining one kept for comparison with a next vertical sample. Thereafter, the sample determining module 320 determines which of the many vertical samples obtained can be used to represent each of the color intervals.

In another exemplary embodiment, the sample determining module 320 determines which of the many vertical samples obtained can be used to represent each of the color intervals according to following steps. First, the sample determining module 320 acquires known standard deviations of each of known vertical samples of the different color intervals of a known sample image; second, calculates a standard deviation of a vertical sample of the to-be-tested image according to the steps of the above exemplary embodiment; third, calculates a difference between the calculated standard deviation R (x) and each of known standard deviations. The sample determining module 320 defines that the vertical sample of the to-be-tested image and the known vertical sample are in the same color interval if the difference is in a predetermined range and discards one and obtains another one for comparison with the known vertical sample. Otherwise, the vertical sample of the to-be-tested image and the known vertical sample are in the different color intervals if the difference is not in a predetermined range and discards one and obtains another one for comparison with the known vertical sample. Thereafter, the sample determining module 320 determines which of the many vertical samples obtained can be used to represent each of the color intervals according to the above steps.

The interval sequence determining module 330 is configured to take pixels from many vertical samples of each color interval to calculate a mean value of the RGB values of each color interval respectively, determine a color corresponding to each of color intervals according to the calculated mean values of the RGB values, and determine an interval sequence of the to-be-tested image and the code sequence of the color intervals.

Figure 2D:
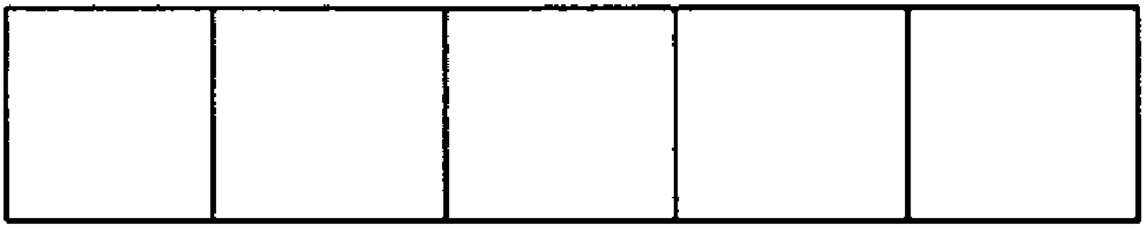

The image format determining module 340 is configured to determine an image format corresponding to the code sequence according to the image format table, as shown in FIG. 2D.

Figure 3:
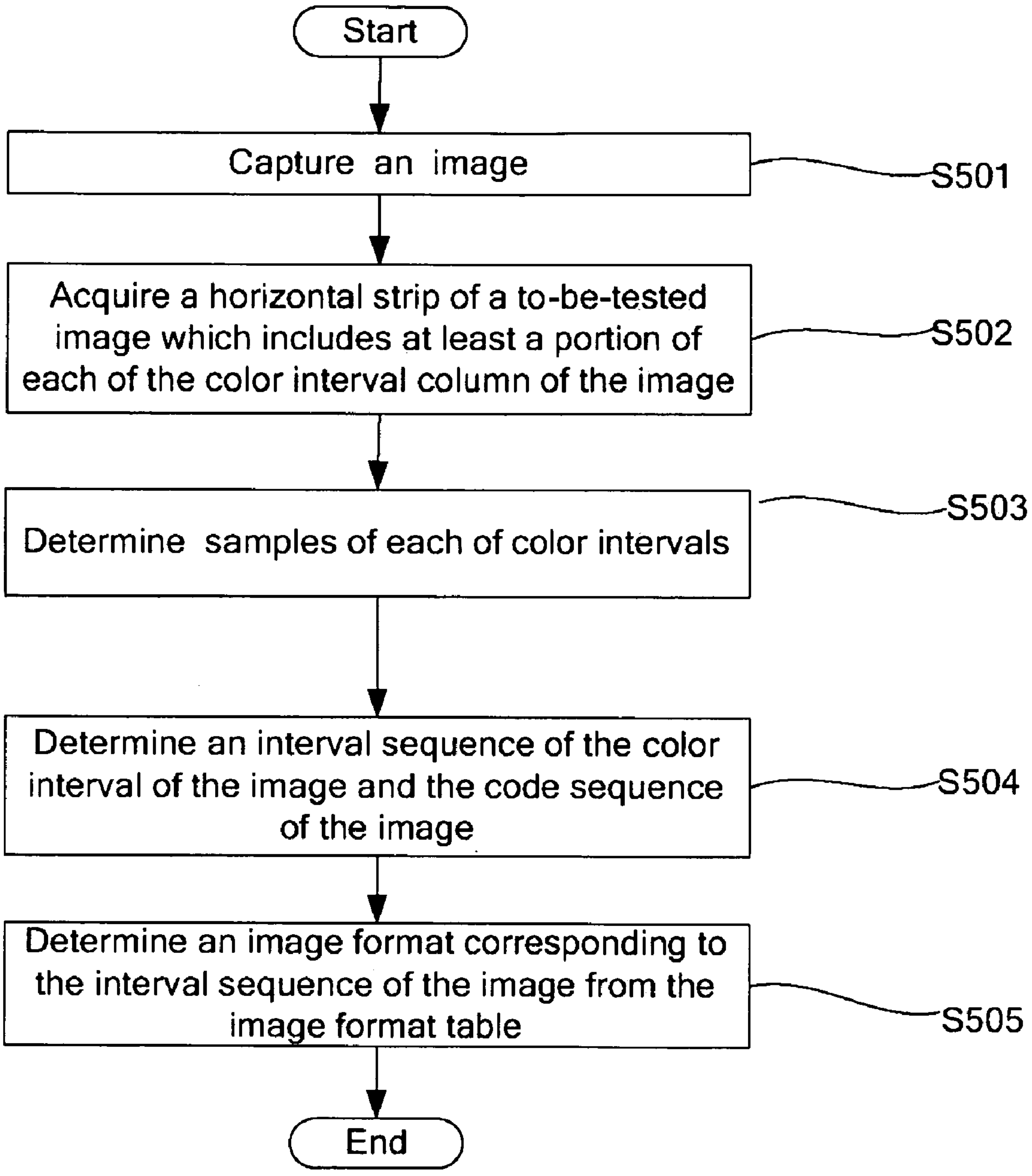
FIG. 3 is a flowchart of a method of automatically testing display device implemented by the system of FIG. 1 in accordance with an exemplary embodiment.

FIG. 3 is a flowchart of a method of automatically testing display device implemented by the system of FIG. 1 in accordance with an exemplary embodiment.

In step S501, the image capturing unit 100 captures an image of the testing images displayed by the display device 100.

In step S502, the image acquiring module 310 acquires a horizontal strip of a to-be-tested image which includes at least a portion of each of the color interval column of the image.

In step S503, the sample determining module 330 compares a standard deviation A of RGB values of pixels in a narrow vertical sample of the horizontal strip with a standard deviation B of RGB values of pixels of an adjacent vertical sample to obtain samples of each color interval from many samples taken, detailed description can refer to that shown in FIG. 2C.

In step S504, the interval sequence determining module 330 takes pixels from many vertical samples of each color interval to calculate a mean value of the RGB values of each color interval respectively, determines a color corresponding to each of color intervals according to the calculated mean values of the RGB values, and determines an interval sequence of the to-be-tested image and the code sequence of the color intervals.

In step S505, the image format determining module 340 determines an image format corresponding to the code sequence according to the image format table.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A test device for automatically testing a display device, comprising:

- an image capturing unit capable of capturing images of testing images displayed by the display device;
- a storage unit capable of storing the captured testing images and an image format table, wherein each of the captured images is composed of at least two color intervals in columns of equal size and typically not the same color as the color intervals, and each of the color intervals is assigned an identification code, and each of an interval sequences of the color intervals of the image corresponds to an image format, and the image format table records a plurality of image formats corresponding to the interval sequences of the color intervals of the images;
- a display unit;
- a processing unit comprising:
  - an image acquiring module capable of acquiring a horizontal strip of a to-be-tested image which includes at least a portion of each of the color interval column of the image;
  - a sample determining module capable of comparing a standard deviation A of RGB values of pixels in a narrow vertical sample of the horizontal strip with a standard deviation B of RGB values of pixels of an adjacent vertical sample to obtain samples of each color interval from a plurality samples taken;
  - an interval sequence determining module capable of taking pixels from a plurality vertical samples of each color interval to calculate a mean value of the RGB values of each color interval respectively, determining a color corresponding to each of color intervals according to the calculated mean values of the RGB values, and determining an interval sequence of the to-be-tested image and the code sequence of the color intervals;
  - an image format determining module capable of determining an image format corresponding to the interval sequence according to the image format table.

2. The test device as in claim 1, wherein the image capturing unit is a built-in camera.

3. The test device as in claim 1, wherein the image capturing unit is an external device which is connected to the processing unit via an interface.

4. A method for automatically testing a display device, the method comprising:

capturing images of testing images displayed by the display device, wherein each of the captured images is composed of at least two color intervals in columns of equal size and typically not the same color as the color intervals, and each of the color intervals is assigned an identification code, and each of an interval sequences of the color intervals of the image corresponds to an image format;

acquiring a horizontal strip of a to-be-tested image which includes at least a portion of each of the color interval column of the image;

comparing a standard deviation A of RGB values of pixels in a narrow vertical sample of the horizontal strip with a standard deviation B of RGB values of pixels of an adjacent vertical sample to obtain samples of each color interval from many samples taken;

taking pixels from a plurality vertical samples of each color interval to calculate a mean value of the RGB values of each color interval respectively, determining a color corresponding to each of color intervals according to the calculated mean values of the RGB values, and determining an interval sequence of the to-be-tested image and the code sequence of the color intervals;

determining an image format corresponding to the interval sequence according to an image format table which records a plurality of image formats corresponding to the interval sequences of the color intervals of the images.

* * * * *